United States Patent [19]
Widmann

[11] Patent Number: 5,980,344
[45] Date of Patent: Nov. 9, 1999

[54] MARINE ENGINE EXHAUST PROCESSING SYSTEM

[75] Inventor: George F. Widmann, Palm Harbor, Fla.

[73] Assignee: ECO Sound Inc., Tarpon Springs, Fla.

[21] Appl. No.: 09/045,689

[22] Filed: Mar. 23, 1998

[51] Int. Cl.$^6$ .................................................. B63H 21/32
[52] U.S. Cl. ............................................................. 440/89
[58] Field of Search .................................. 440/89; 60/310; 181/235, 259, 260, 221

[56]  References Cited

U.S. PATENT DOCUMENTS 4,002,136  1/1977  Michalak .................................. 440/89

Primary Examiner—Ed Swinehart
Attorney, Agent, or Firm—Harold D. Shall

[57] ABSTRACT

An exhaust system for an internal combustion engine in a boat with exhaust manifold of the engine connected to an exhaust chamber. Within the exhaust chamber is a vacuum wedge having a top plate with a vertical opening therein with the top plate being spaced from the front wall of the exhaust chamber and its rearward end connected at its laterally edges to the hull at the junction of the transom and bottom of the hull and the rearward end portion, intermediate the lateral edges, connected to the transom or rear wall of the boat. The sides of the top plate being connected by side walls to the hull bottom and having lateral openings. An opening is formed in the hull bottom and extends laterally between these side walls and from the transom forward to underly the top plate so that the exhaust chamber is vented through the vacuum wedge when the boat is on plane. Standpipes connect vertically extending openings in the top plate to a location in the exhaust chamber above the stationary water line. When not on plane, low speed exhaust pipes connect the exhaust chamber to the outside of the hull above the water line. Vacuum pipes extend into the chamber with their intakes at the location of the stationery waterline, and a vacuum pump pumps water from the vacuum pipes to an oil/carbon separator and a second pump pumps the water from that separator to a oil/water separator and from the latter out the side of the hull.

9 Claims, 4 Drawing Sheets

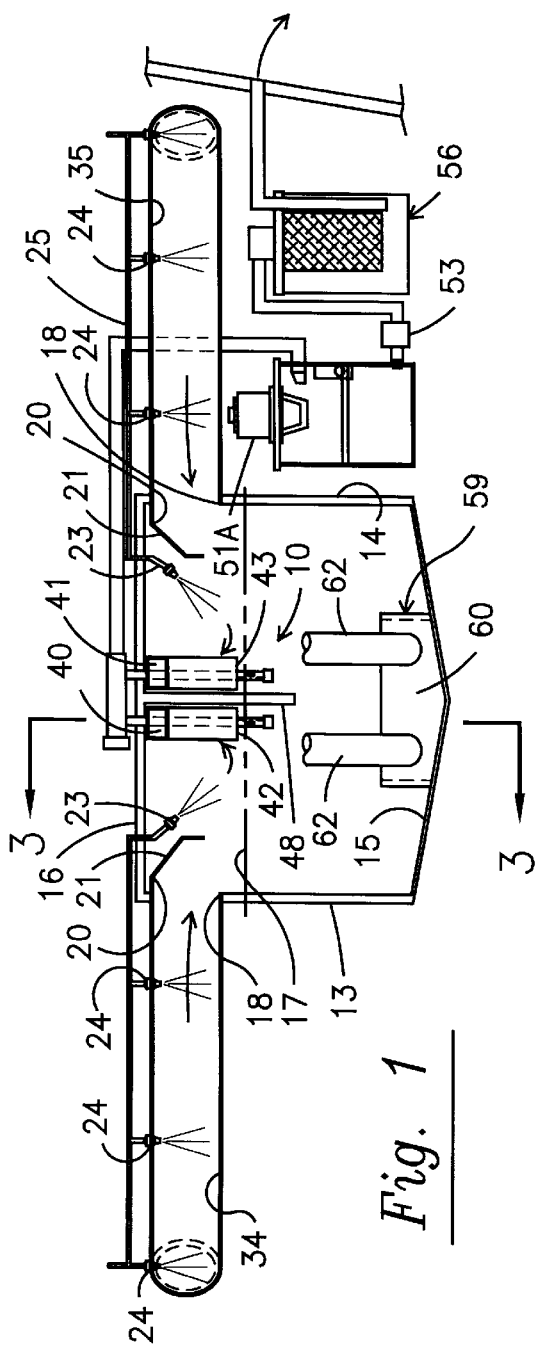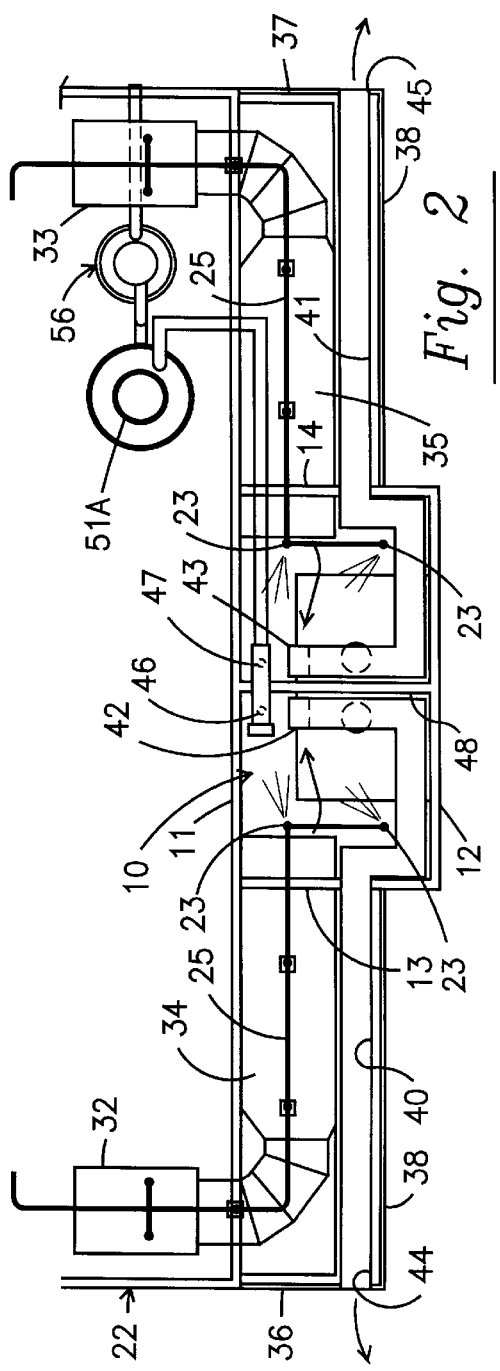

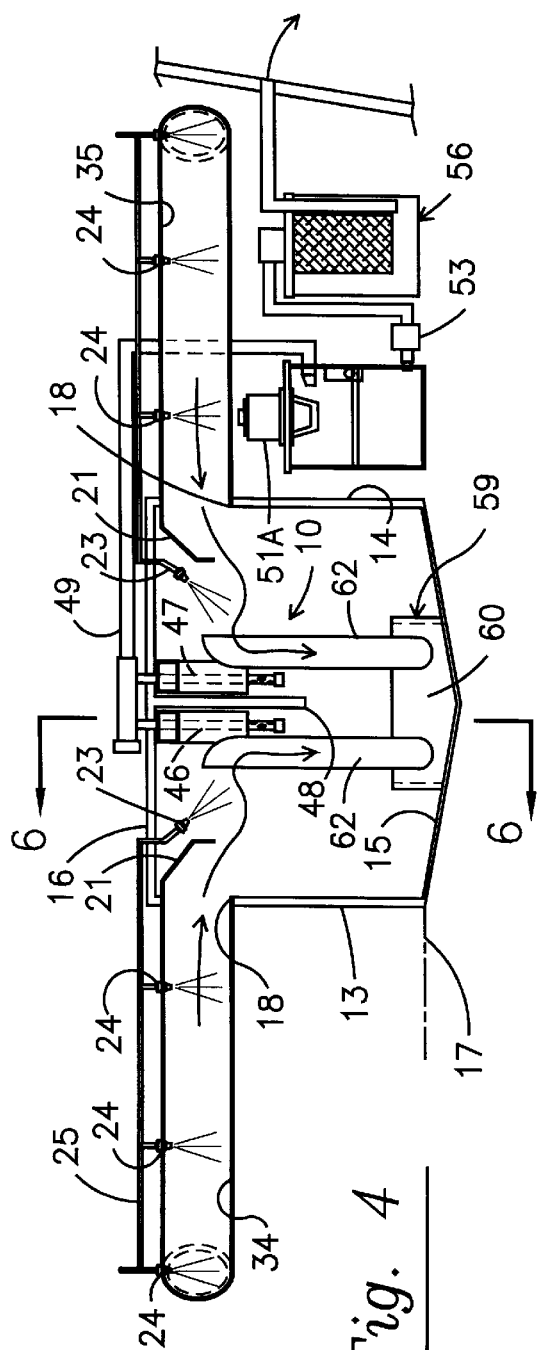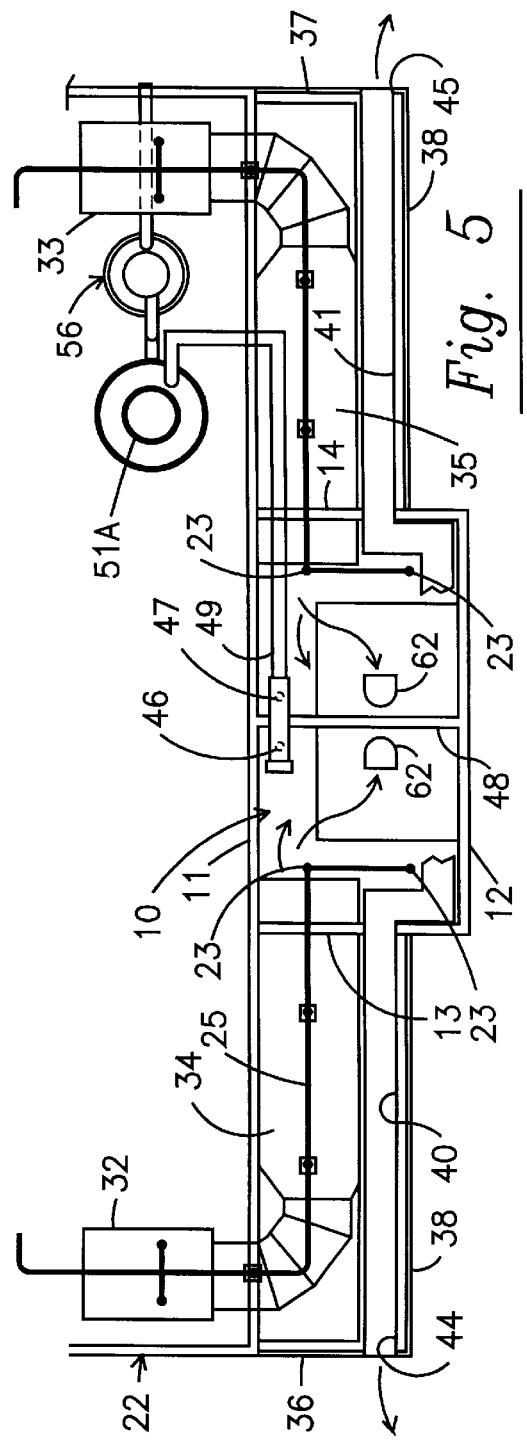

MARINE ENGINE EXHAUST PROCESSING SYSTEM

BACKGROUND OF THE INVENTION

1. Field of the Invention

This invention relates to an exhaust processing system, and more particularly to such a system which includes features for engine exhaust noise suppression, the provision of exhaust negative back pressure and the trapping and treating of the exhaust to capture the waste by-products of combustion, such as oil and carbon therein.

2. Description of the Prior Art

Inboard marine engines are very noisy in their operation, especially at higher RPM. Diesel engines (and some gasoline engines) have a dirty exhaust at low RPM, because of poor efficiency, and their exhausts carry particulate unburned oil, carbon, soot, and other undesirable particulate by-products of the engine's combustion. It is therefore an object of this invention to provide an exhaust processing system which provides engine noise suppress and exhaust negative back pressure, and also provides for the treatment of the exhaust to remove from the gaseous exhaust, waste by-products of combustion and other particulate matter which are present in the exhaust gasses.

Devices such as those shown in U.S. Pat. No. 4,002,136 do not provide a structure which adequately produces a sufficient reduction in exhaust back pressure or noise, and does not provide for the removal of combustion by-products and non-combusted material from the exhaust. My co-pending application Ser. No. 08/880,143, filed Jun. 20, 1997, now U.S. Pat. No. 5,846,107, does provide for noise suppression and back pressure reduction, but does not provide for removal of waste products as does the structure of the present invention and the noise reduction and negative back pressure is not as substantial as the present structure; however, the structure therein is adequate for many applications.

SUMMARY OF THE INVENTION

It is, therefore, an object of this invention to provide a marine engine exhaust processing system which reduces the noise level of the exhaust discharge. It is another objection of this invention to remove non-combusted and particulate matter from the exhaust gases.

To that end, and exhaust chamber is provided at the rear (stern) of the vessel, which chamber is confluently connected to he engines exhaust manifold. The rear wall of the chamber can be the transom of the vessel so that the chamber is contained within the vessel, or the chamber can be mounted on the rear of the transom, either by making the transom the front wall of the chamber or by mounting the front wall of the chamber on the rear of the vessel's transom.

At low speeds, the chamber has a level of water therein substantially co-planes with the external water level. As the exhausts reaches the chamber, a spray of water can be directed to the path of the exhaust to knock down oil and particulate matter in the exhaust onto the water in the chamber. A vacuum extractor withdraws the upper layer of the chambers water which contains the oil and particulate matter and directs the same to an oil-carbon separator wherein non-combusted oil and carbon are separated from the chamber water and biodegraded. The chamber water is then pumped off the lower end of this separator, and this water is fairly clean, to the top of an oil water separator which, through a filter cartridge, removes substantially all oil remaining in this effluent and discharges water free of oil/carbon overboard. Exhaust at this time leaves the chamber through a low speed exhaust outlet which extends out through the side of the vessel above the water level in the chamber.

At higher efficient speeds, the vessel comes on plane and the exhaust is discharged through the bottom of the chamber and into the water through a vacuum wedge. The wedge has a top surface angled downwards towards the rear of the chamber, and which wedge is open at its front end, has a pair of side walls with each having an exhaust outlet therein, and has at least one stand pipe confluent with the top of the wedge and extending upwardly above the at-rest water level so that exhaust may pass through the wedge and out through the bottom of the vessel though an opening therein confluent with the wedge. When the vessel is on plane, exhaust gasses in the chamber pass out through the stand pipe and the openings in the side walls of the wedge.

BRIEF DESCRIPTION OF THE DRAWINGS

FIG. 1 is a rear view of a marine engine exhaust system showing the exhaust chamber with the rear wall omitted and portions thereof shown schematically and the vessel not on plane;

FIG. 2 is a plan view of the structure shown in FIG. 1 with the top of the exhaust system omitted;

FIG. 4 is a view taken like FIG. 1 with the vessel on plane;

FIG. 5 is a plane view like FIG. 2 with the vessel on plane;

DETAILED DESCRIPTION OF THE PREFERRED EMBODIMENT

Figure 3:
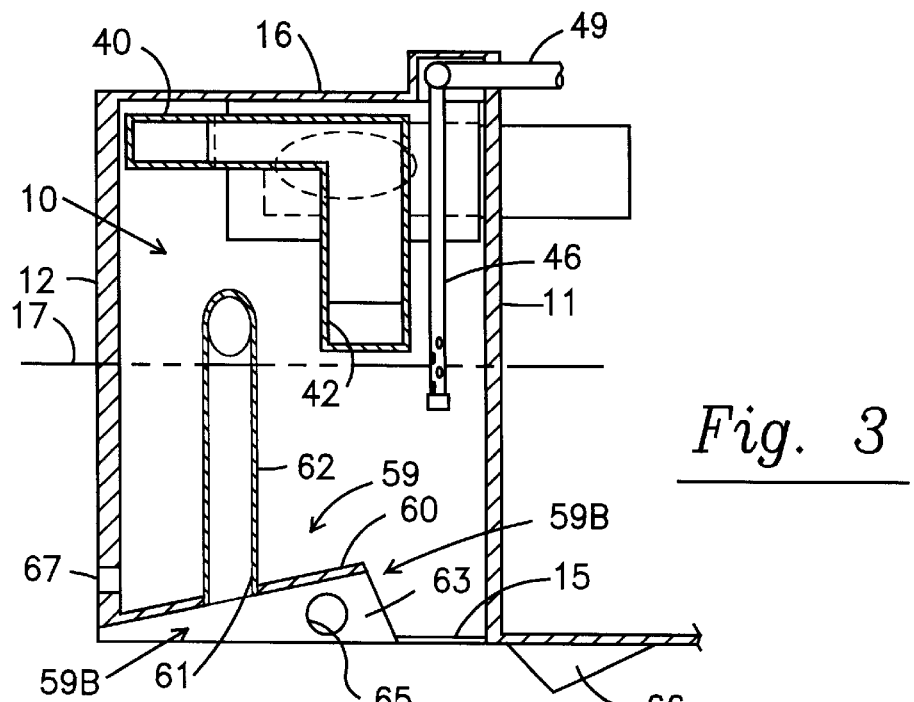
FIG. 3 is a cross sectional view taken along the lines 3—3 in FIG. 1.

Referring now to the drawings and more particularly to FIGS. 1, 2, 3, and 7, wherein a chamber is shown with the vessel at rest, the exhaust chamber is shown generally at 10 and has a front wall 11, a rear wall 12 side walls 13 and 14 and a bottom wall 15. As shown in the drawings, the front wall 11 can be the transom of a vessel shown generally at 22, however, the exhaust chamber can be within the vessel so that the rear wall 12 of the chamber is the transom of the vessel and the front wall 11 a separate structure within the vessel forward of the transom and the bottom wall being the hull bottom. A water supply or manifold 25 for a plurality of spray nozzles 23 and 24 (shown most clearly in FIG. 7) is confluently connected to the spray nozzles 23 and 24. The manifold 25 is supplied with sea water by an 124 psi gear pump 26 which, in turn, is supplied through a pair of in line filters 27 and 28 and a salt water intake 29, the lower end 30 thereof projecting through the bottom 31 of the vessel 22.

As shown in the drawings, the vessel 22 has two exhaust manifolds 32 and 33 each connected to one of the diesel engines (engine not shown) within the vessel 22, which manifolds extend through the transom 11 and into a left transfer box 34 and a right transfer box 35, respectively. The transfer boxes can be considered an extension of the manifold and have closed lateral outer end walls 36 and 37, a closed rear wall 38 and the front end thereof is closed by the transom 11. The inner ends of the transfer boxes are closed by the side walls 13 and 14 of the exhaust chamber 10, except for an exhaust opening 18 in each of the side walls 13 and 14 near the top wall thereof, through which openings 18, the inner end 20 of the transfer boxes 34 and 35 extend, and whereby the manifolds 32 and 33 are confluent with the inside of the chamber 10. The axially inner end of the top walls 21 of the transfer boxes 34 and 35 extend into the chamber 10 and are bent downwardly so that exhaust entering the chamber 10 will be deflected downwardly onto the surface of the water (see waterline 17 in FIGS. 1 and 7) contained within the chamber 10. The waterline 17 within the chamber is the same level as the waterline outside the chamber when the vessel 22 is stationary or at low speeds.

Figure 6:
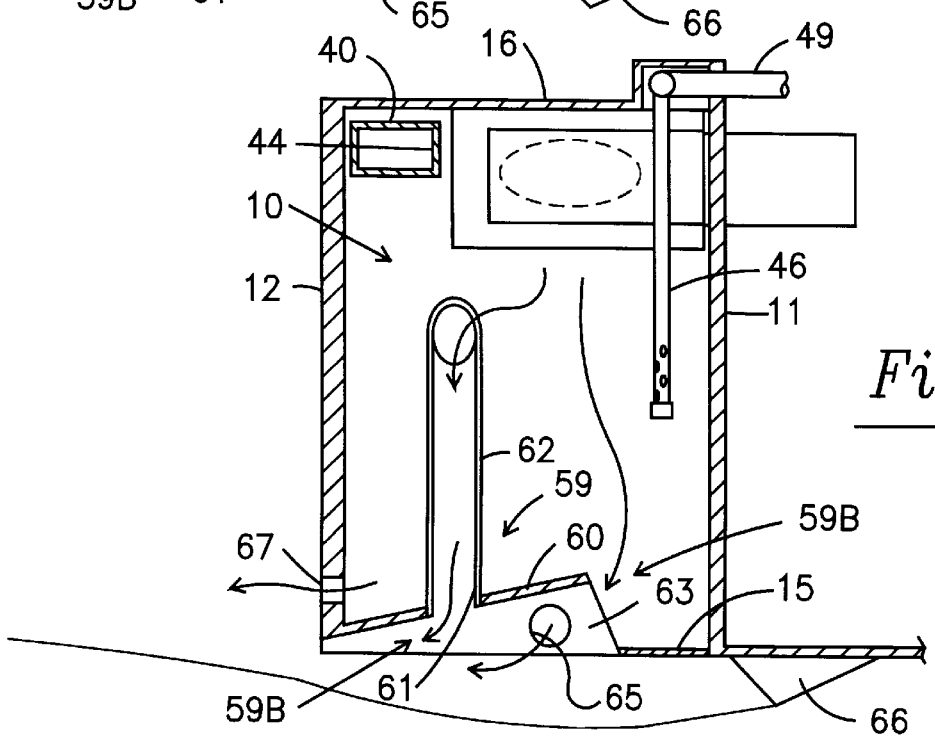
FIG. 6 is a cross sectional view taken along the lines 6—6 in FIG. 4, with a portion of the low speed exhaust omitted.

Referring now to FIGS. 3, 5, and 6, a pair of low speed exhaust lines 40 and 41 each extends from its inner end 42 and 43, disposed slightly above the water line 17 respectively, to open through the side of the vessel as show at 44 and 45, respectively. At low speeds, the exhaust from the transfer boxes 34 and 35 are directed downwardly into the chamber 10 where they strike the surface of the water at the waterline 17 and then exit the chamber through the low speed exhaust lines 40 and 41 and out the ends thereof, 44 and 45 respectively. The water from spray nozzles 23 and 24 help clean the exhaust of oil and particulate matter such as carbon. More particularly, the exhaust nozzles 24 are referred to as scrubbing nozzles in that they are atomizing nozzles, and water sprayed therefrom knock out oil/carbon (particulate matter) from the exhaust gasses where they are swept from the transfer boxes along with the spray water and into the exhaust chamber 10 where they rest on the surface of the water contained therein. These nozzles are referred to as FogJet® nozzles and are available from Spraying Systems Co. of Wheaton, Ill. The nozzles 23 are flood jet nozzles and are disposed at an angle directed toward suction lines 46 and 47. FloodJet® spray nozzles are also available from Spraying Systems Co. of Wheaton, Ill.

More particularly, the chamber 10 has medial wall 48 which extends from the top wall 16 downwardly to a short distance below the low speed waterline thus dividing the upper portion of the chamber in two. The suction lines 46 and 47 extend from a suction manifold 49 downwardly so that their lower sealed ends extend below the water line and are perforated in the area at slightly above and below the water line. The manifold 49 leads to a oil/carbon separator 50, wherein the oil/carbon is separated from the water, and enters the side of the tank portion 50A thereof, adjacent the top 51 thereof. A vacuum pump 51A, available from the Lamb Electric Division of Ametek, in Kent Ohio, creates a partial vacuum within the tank 50A (much in the same manner as a "shop vac") and sucks the surface water in the chamber 10, along with the oil/carbon therein and thereon through the manifold 49 and into the tank 50A. A timer 51B activates the pump 51A on and off. A period of 15 seconds on and 15 minutes off has been found suitable for most operations. Since the timer can be adjusted, the run duration can be adjusted to fit the operating parameters of the vessel. The tank 50A contains a biological digestion material, such as BIOSOCK available from RGF Marine Environmental Tech Inc. of West Palm Beach, Fla., which digests the material carried by the water, and the relatively clean water is withdrawn from the separator 50 adjacent the bottom thereof. A float valve 50B in the separator 50 controls the liquid level in the separator by turning on and off a sump pump 53 in a conventional manner with the pump connected in a drain line 54 which enters the tank 50A near the bottom thereof and pumps the relatively clean water from the bottom of the tank 50A up through a line 55 and into the top of an oil/water separator 56 available from RGF Marine Environmental Tech Inc. of West Palm Beach, Fla. The separator 56 contains a filter cartridge 58 which removes substantially all the oil from the water so that "environmentally acceptable" effluent from the separator 56 is discharged from the bottom thereof through a discharge line 57 and out of the side of the vessel 22.

Figure 7:
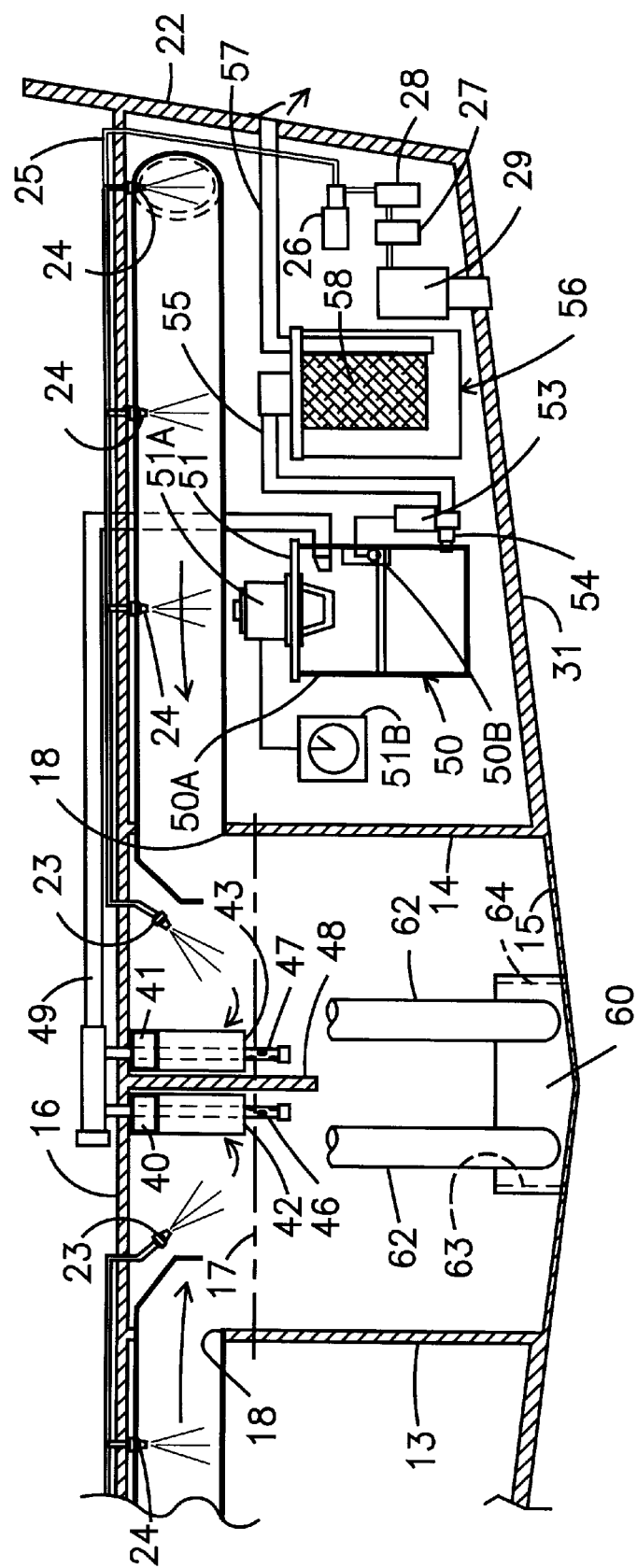
FIG. 7 is a view taken like FIG. 1 also showing schematically, the source of water for the water spray.

As seen in FIGS. 1, 2, and 7, the spray nozzles 23 are directed inwardly and rearwardly so that the spray therefrom drives the surface of the water in the chamber, along with any oil/carbon therein, to the suction lines 46, 47 on the nozzle's side of the wall 48, to concentrate these contaminants in the area of the suction lines.

Means provide a negative back pressure in the exhaust chamber 10. More particularly, a laterally centralized vacuum wedge, shown generally at 59, includes a top plate 60, the rear end thereof commencing at the junction of the rear and bottom walls of the chamber 10 and extending forwardly and upwardly therefrom so that at the plate's forward end, it is spaced above the bottom wall 15. The width of the wedge 59 was well as the angle of the plate 60 can be selected to fit the operating parameters of the vessel; however, as seen in the drawings, it can be about one-third the lateral width of the chamber 10. A pair of laterally spaced openings 61 (one of which can be seen in FIGS. 3 and 6) are provided centrally in the angle plate 60 and a standpipe 62 is secured into each opening and extends upwardly therefrom to terminate above the waterline 17. The top of the pipes are slanted downwardly and inwardly from the top thereof so that water from the sprays 23 tend not to enter the pipes 62, while the pipes are clearly open to exhaust gasses.

The wedge 59 has laterally spaced side walls 63 and 64 connecting the top plate 60 to the bottom 15 of the chamber 10, which side walls 63 and 64 (see wall 63 in FIG. 3 and 6) are slanted downwardly and forwardly so that an opening 59A is provided between the front end of the plate 60, the side walls 63 and 64 and the bottom wall 15 of the chamber 10. The side walls 63 and 64 preferable each has a side opening 65 extending therethrough, and the entire rear of the chamber bottom 15 within the confines of the wedge 59 is removed at 59B. An external wedge 66 is preferably formed on the bottom of the vessel 22 forward of the opening 59B to enhance the operation of the vacuum wedge at planing speeds. An opening 67 in the lower rear wall of the chamber 10 is a water relief hole and this hole along with the openings 59A, openings 65 and opening 59B allow the water in the chamber to equalize with the water outside the vessel 22.

At rest, the exhaust gasses entering the chamber 10 are blocked from the vacuum wedge by the water within the chamber, and leave the chamber through the low speed exhaust lines 40 and 41. During this time, the vacuum oil/carbon separator is removing oil and carbon from the top of the water in the chamber 10 as the vessel moves up on plane, sea water flowing past the openings 59B, enhanced by the wedge 66, provides a negative pressure with the chamber and exhaust gasses from the chamber exit the same through the stand pipe 62, the openings 65 and 59A in the wedge 59 and finally out through the opening 59B in the bottom of the vacuum wedge; minor amounts may pass out of the opening 67 until the pressure within the chamber 10 falls below atmospheric, at which time air will come into the chamber. By removing the oil/carbon from the exhaust at low idle or near idle speeds and ejecting the exhaust from the sides, a clean exhaust away from boat occupants is obtained. At higher speeds when the engines are operating efficiently, little if any oil/carbon is contained in the exhaust and the exhaust is buried in the water. If only one engine is used with one exhaust manifold, the chamber can be adjusted for size, the medial wall 48 omitted, and the vacuum wedge 59 centralized.

While only a single embodiment is shown and described, many changes and modifications can be made therein without departing from this invention as defined in the following claims.

What is claimed is:

1. An exhaust system in combination with an internal combustion engine means of a boat having a planing hull with a bottom surface and with a rear hull wall at its rearward end and a stationary water line above the lower surface of said hull comprising,
   a) an internal combustion engine having at least one exhaust manifold,
   b) an exhaust chamber in said hull, with said chamber having a forward wall, a top wall, a pair of spaced side walls and a rear wall of said chamber and with said bottom surface of said hull forming the bottom of said chamber,
   c) conducting means connecting said exhaust manifold to said exhaust chamber at a level above the water line of said hull,
   d) a vacuum wedge in said exhaust chamber having
      i) a wedge plate having a front edge, a rear edge and a pair of side edges, with said front edge being above said lower surface of said hull and extending angularly rearwardly and downwardly therefrom and with said rear edge connected to the junction of said rear hull wall and said lower surface of said hull, and said wedge plate having a pair of laterally spaced side walls,
      ii) said wedge plate having a vertically extending openings intermediate the front and rear edges thereof, and
      iii) said lower surface of said hull having a hull opening open beneath said wedge plate whereby said vacuum wedge provides a high speed exhaust path from said exhaust chamber through said hull opening,
   e) low speed exhaust path means connecting to said exhaust chamber at a location above said stationary water line extending to open outside said hull at a location above said stationary water line, and
   d) a stand pipe connected to said wedge plate opening, said stand pipe extending upwardly from said wedge plate and terminating above said stationery water line.

2. A system according to claim 1 wherein said conducting means extends into said exhaust chamber and has a rearward end projecting into said chamber, and said rearward end has a down turned top lip.

3. A system according to claim 2 wherein said conducting means including a first and a second conducting means and said first conducting means and said second conducting means connect to said exhaust chamber on the lateral sides thereof, said exhaust chamber has a baffle means therein between said first and second conducting means and said wedge plate has two vertically extending openings on opposite lateral sides of said baffle means and each having a stand pipe therein with said standpipes extending upwardly from said wedge plate and terminating above said stationery water line.

4. A system according to claim 3 wherein said baffle means is an intermediate wall connected to the top, front and rear walls of said exhaust chamber and spaced above said wedge plate.

5. A system according to claim 1 wherein a laterally extending opening is formed in each side wall of said wedge plate.

6. A system according to claim 1 wherein said exhaust manifold has first water spraying means therein for spraying on the exhaust passing through said manifold before reaching said chamber, a vacuum pipe having an intake at the level of said stationary water line which intake is confluent with an oil/carbon separator, with the latter being confluent with an oil/water separator and from the latter being discharged from the hull.

7. A system according to claim 6 wherein said chamber has second water spraying means therein, and said second water spraying means has is spray directed at said vacuum pipe intake.

8. An exhaust system in combination with an internal combustion engine means of a boat having a planing hull with a bottom surface and with a rear hull wall at its rearward end and a stationary water line above the lower surface of said hull comprising,
   a) an internal combustion engine having at least one exhaust manifold,
   b) an exhaust chamber in said hull, with said chamber having a forward wall, a top wall, a pair of spaced side walls and a rear wall of said chamber and with said bottom surface of said hull forming the bottom of said chamber,
   c) conducting means connecting said exhaust manifold to said exhaust chamber at a level above the water line of said hull,
   d) a vacuum wedge in said exhaust chamber having
      i) a wedge plate having a front edge, a rear edge and a pair of side edges, with said front edge being above said lower surface of said hull and extending angularly rearwardly and downwardly therefrom and with said rear edge connected to the junction of said rear hull wall and said lower surface of said hull, and said wedge plate having a pair of laterally spaced side walls,
      ii) said wedge plate having a vertically extending openings intermediate the front and rear edges thereof, and
      iii) said lower surface of said hull having a hull opening open beneath said wedge plate whereby said vacuum wedge provides a high speed exhaust path from said exhaust chamber through said hull opening,
   e) low speed exhaust path means connecting to said exhaust chamber at a location above said stationary water line extending to open outside said hull at a location above said stationary water line,
   f) said exhaust manifold has first water spraying means therein for spraying on the exhaust passing through said manifold before reaching said chamber, a vacuum pipe having an intake at the level of said stationery water line which intake is confluent with an oil/carbon separator and from the latter being discharged from the hull.

9. A system according to claim 8 wherein said chamber has second water spraying means therein, and said second water spraying means has is spray directed at said vacuum pipe intake.

* * * * *